US007698512B2

(12) United States Patent
Magklis et al.

(10) Patent No.: US 7,698,512 B2
(45) Date of Patent: Apr. 13, 2010

(54) COMPRESSING ADDRESS COMMUNICATIONS BETWEEN PROCESSORS

(75) Inventors: Grigorios Magklis, Barcelona (ES); Jose Gonzalez, Terrassa (ES); Pedro Chaparro, Barcelona (ES); Qiong Cai, Barcelona (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 11/827,904

(22) Filed: Jul. 13, 2007

(65) Prior Publication Data

US 2009/0019219 A1    Jan. 15, 2009

(51) Int. Cl.
*G06F 12/00* (2006.01)

(52) U.S. Cl. ..................................................... 711/154
(58) Field of Classification Search ........................ None
See application file for complete search history.

(56) References Cited

U.S. PATENT DOCUMENTS 6,658,447 B2    12/2003  Cota-Robles ............... 709/103
7,089,372 B2 *   8/2006  DeSota et al. ............... 711/144

OTHER PUBLICATIONS

Mircea R. Stan, et al., "Bus-Invert Coding for Low-Power I/O", Mar. 1995, pp. 49-58.
Andreas Moshovos, "Exploiting Coarse Grain Non-Shared Regions In Snoopy Coherent Multiprocessors," Dec. 2, 2003, pp. 1-12.
Jason F. Cantin, et al., "Improving Multiprocessor Performance With Coarse-Grain Coherence Tracking,"2005, pp. 1-12.
Enric Musoll, et al., "Working-Zone Encoding For Reducing The Energy In Microprocessor Address Buses," Dec. 1998, pp. 568-572.
Arvin Park, et al., "Address Compression Through Base Register Caching," 1990, pp. 193-199.
Jiangjiang Liu, et al., "Dynamic Address Compression Schemes: A Performance, Energy, and Cost Study," Oct. 2004, pp. 1-6.
Matthew Farrens, et al., "Dynamic Base Register Caching: a Technique for Reducing Address Bus Width," 1991, pp. 1-10.

* cited by examiner

*Primary Examiner*—Hiep T Nguyen
(74) *Attorney, Agent, or Firm*—Trop, Pruner & Hu, P.C.

(57) ABSTRACT

In one embodiment, the present invention includes a method for determining if data of a memory request by a first agent is in a memory region represented by a region indicator of a region table of the first agent, and transmitting a compressed address for the memory request to other agents of a system if the memory region is represented by the region indicator, otherwise transmitting a full address. Other embodiments are described and claimed.

28 Claims, 8 Drawing Sheets

COMPRESSING ADDRESS COMMUNICATIONS BETWEEN PROCESSORS

BACKGROUND

Computer systems are becoming increasingly complex and may include advanced processors, including multicore processors. Dual-core processors having two processor cores that execute instructions concurrently have been introduced. It is anticipated that in the future, processors will be manufactured that include additional cores, e.g., more than two cores. Current road maps include processors with four and eight cores. Additionally, long term it is anticipated that processors will evolve to a many-core environment, in which many cores are present in a single processor package, and even on a single substrate or die of the package. Accordingly, it is anticipated that processors with 8, 16, 32, 64, 128 or more cores will become available in the future.

These many cores may be relatively simple, e.g., in-order cores to ease complexity and power dissipation issues. Such cores may accordingly execute parallel applications with reduced power consumption. However, as the complexity of cores is simplified, complexity and power dissipation of an interconnect system that couples these cores together increases. Furthermore, such an interconnect system can consume a significant chip area. Thus while processors based on simple cores may reduce complexity and power dissipation by the cores, other portions of the processor, such as the interconnect system may consume some or all of these gains.

DETAILED DESCRIPTION

Figure 1:
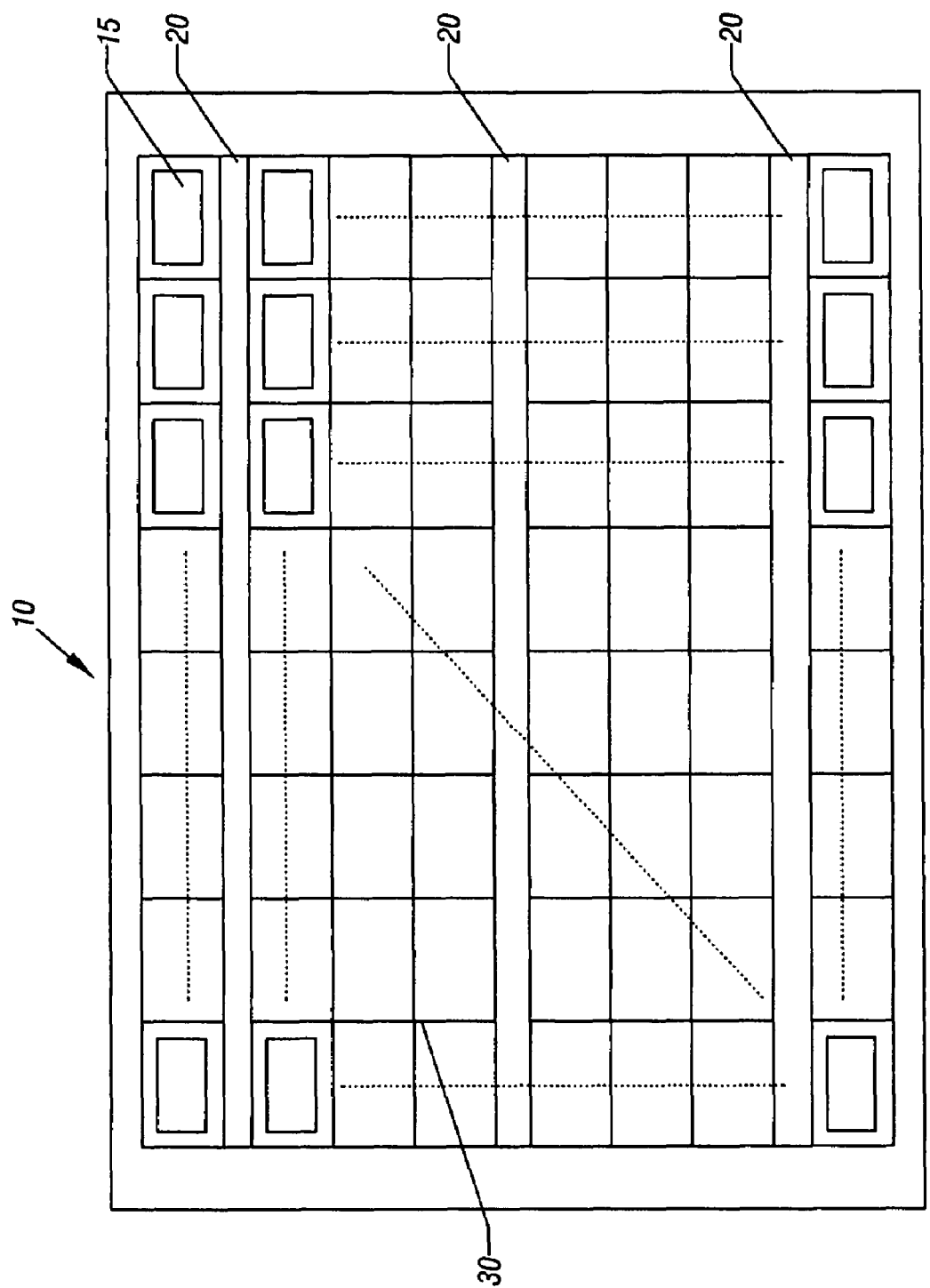
FIG. 1 is a block diagram of a many-core processor in accordance with one embodiment of the present invention.

In various embodiments, addresses associated with memory requests may be transmitted with a reduced amount of address information. In this way, the amount of interconnects that couple multiple cores or other agents together may be reduced (e.g., a reduced number of wires may be provided). Furthermore, in some implementations power reductions may also be realized, as the amount of information to be transmitted to request data from another location may be reduced. While the scope of the present invention is not limited in this regard, many embodiments may be implemented in a many-core processor in which a number of relatively small cores may be provided.

In some implementations, each core may include a storage area such as a register file or other storage. Such storage areas may be referred to herein as region tables. In one embodiment, each core may include a region table (RT) for every core present in the processor. Furthermore, each RT may include multiple entries, each entry to store a portion of an address associated with a given region of memory. For example, a region of memory may correspond to a contiguous portion of memory that is addressed using common bits of an address, e.g., the most significant bits (MSBs). Thus, instead of transmitting the entire region address in connection with a memory request for data from that region, only a region identifier, which may be an index of the entry of the region table in which the region address portion is stored, may be sent. In this way, a significant reduction in the amount of address bits (and corresponding wires of an interconnect, in many embodiments) may be realized. Although the scope of the present invention is not limited in this regard, in one embodiment each region table may include four entries such that each entry may be identified by a two-bit region indicator.

As described, each core may include a region table for every core in the processor. Furthermore, each core may own its local region table, while it may instead include a copy of the region table of the other (i.e., remote) cores. When a memory request issued by a given core misses (e.g., in a private cache), the memory request is to be sent to the other cores of the processor via an interconnect system. Using embodiments of the present invention, an associative search may be performed in the local region table using the region address portion of the address for the requested data. If a match exists in the local RT, the region identifier (i.e., the number of the entry that matches the region address portion) may be sent as part of the address portion of the data request via the interconnect, instead of the entire region address portion. That is, the region identifier may be concatenated with an offset portion, which may point to an offset within the region of memory. Furthermore, an indicator, e.g., a one-bit indicator to indicate whether the region identifier is present or not, may be included in the address of the memory request. Accordingly, in various implementations a compressed address message may include a status indicator, a region identifier, and an offset address portion. In one embodiment, assuming a four-entry region table, and further assuming a 32-bit full address for accessing memory, a compressed address message may correspond to 19 bits (i.e., one control bit to signal whether the address is compressed, a 2-bit region identifier, and a 16-bit address offset). While described with this particular implementation in one embodiment, the scope of the present invention is not limited in this regard, and in other implementations a region table may include more than four such entries and furthermore, a memory address may be longer than 32 bits, address offsets may be differently sized, and so forth.

Referring now to FIG. 1, shown is a block diagram of a many-core processor in accordance with one embodiment of the present invention. As shown in FIG. 1, processor 10 may be a chip multiprocessor (CMP) including a plurality of individual cores 15. More specifically, the embodiment of FIG. 1 shows a configuration that includes an 8×8 array of cores coupled via an interconnect fabric 30. While shown with this particular implementation in the embodiment of FIG. 1, it is to be understood that the scope of the present invention is not so limited, and in other embodiments other configurations may be present, such as one-dimensional, two-dimensional or three-dimensional meshes or one-dimensional, two-dimensional, or three-dimensional torus configurations, for example. Further, while shown with 64 individual cores in the embodiment of FIG. 1, it is to be understood that many-core processors may include more or fewer such cores in different implementations.

Each core 15 may be a relatively small core, at least compared with single core or dual-core processors. In various embodiments, each core 15 may include a local memory (e.g., a cache memory) and further may be coupled to shared memory. Specifically, as shown in FIG. 1, a shared memory 20, which is a global shared memory (that may be formed of dynamic random access memory (DRAM), in some embodiments), may be coupled to individual cores 15 via interconnect fabric 30. In various embodiments, interconnect fabric 30 may be a coherent interconnect to enable communication between the multiple nodes of processor 10. That is, each core 15 may correspond to a node of processor 10. Each of these nodes may be masters of interconnect fabric 30, e.g., at different times. To maintain coherency between transactions initiated from various ones of individual cores 15, interconnect fabric 30 may implement a coherent communication protocol such that coherent transactions may be split into multiple messages.

While not shown in FIG. 1 for ease of illustration, it is to be understood that processor 10 may include other components, such as input/output (I/O) interfaces, interconnects, buses, logic and the like. Further as will be discussed below, each core 15 may include a storage such as a region table that may be used to store associations between a region identifier and an address for a region of memory. In this way, the amount of address information sent to request data from a memory (e.g., shared memory 20) may be reduced.

Figure 2:
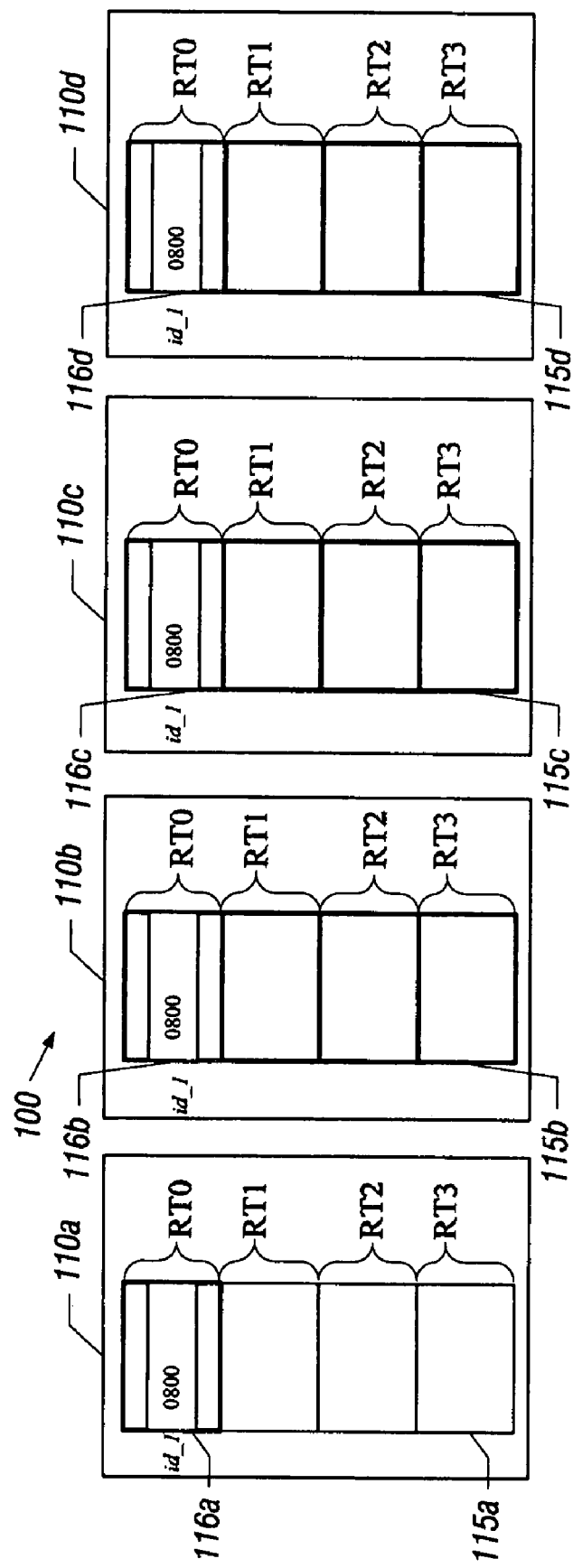
FIG. 2 is a block diagram of a plurality of cores of a processor in accordance with one embodiment of the present invention.

Referring now to FIG. 2, shown is a block diagram of a plurality of cores of a processor in accordance with one embodiment of the present invention. As shown in FIG. 2, processor 100 may include a plurality of cores $110_a$-$110_d$ (generically core 110). In various embodiments, such cores may correspond to cores of a many-core processor of a tera-scale platform, although the scope of the present invention is not limited in this way. As shown in FIG. 2, each core 110 may include a plurality of region tables RT0-RT3. In one embodiment, these region tables may be included in a register file $115_a$-$115_d$ (generically register file 115) of the corresponding core. However, the scope of the present invention is not limited in this regard and in other implementations a different dedicated or general-purpose storage may be used to store the region tables. Note that in the embodiment of FIG. 2, each core includes a region table for every other core. Furthermore, each region table may include a plurality of entries to store region address portions. As an example, RT0 of each core includes an entry $116_a$-$116_d$ (generically entry 116). As described above, in some implementations four such entries may be present in each region table, although the scope of the present invention is not limited in this manner. While not shown for ease of illustration in the embodiment of FIG. 2, understand that cores 110 may be coupled via a common interconnect structure, such as a common bus. Alternately, cores may be coupled via point-to-point (PTP) interconnects between the various cores. Furthermore, while shown for ease of illustration in FIG. 2 as including only register file 115, it is to be understood that each core 110 may include various other structures, including instruction fetch units, instruction issuers, execution units, storage structures, and so forth. Furthermore, as described below, the region tables may be positioned in different locations in various embodiments.

Using the region tables of FIG. 2, each core 110 first may determine whether an outgoing memory request is for a memory location that is present in a region of memory represented by a region address portion stored in a given region table. Specifically, for an outgoing memory request, core 110a (for example) may access its local region table, RT0, to determine whether an entry is present corresponding to the requested memory region. If so, core 110a may generate and transmit a compressed address message for the memory request including the region identifier, a control indicator and an offset address. The control indicator may indicate whether the address message is a compressed message or a full address message, while the offset address may indicate an offset (e.g., from a beginning) of the region of memory represented by the region identifier. Because the other cores have a copy of the local region table RT0 as a remote region table in its respective register file 115, this compressed address message may be decoded by the other cores to determine the actual address of the memory request.

If instead RT0 does not include the requested region, the full address may be sent. In some embodiments, several consecutive accesses of the interconnect may be used to transmit the full address, as in some embodiments fewer wires than the number of bits of the entire memory address may be present. Upon a miss to the region table, core 110a may write the region address of the requested memory in an entry of its local RT0, e.g., into a least recently used (LRU) entry. Furthermore, in addition to transmitting the full memory address for this request, core 110a may also send along the corresponding region identifier for this newly allocated entry so that the other cores 110 may update their remote copy of RT0. Thus a full memory address message may include an indicator to identify the message at a full address message (e.g., a reset control indicator), an identification of the new region identifier for the new entry established in the local core's region table RT0, and the full memory address.

Thus each region table may be split into zones (i.e., RTs 0-3), with each zone corresponding to a different interconnect node (i.e., a different one of cores 110). Each core 110 is able to write (and evict) only entries from its local region table (e.g., RT0 for core $110_a$). However, each core 110 may read and update the remote copies of the other region tables according to interconnect messages received from the owner core. When a core responds to a transaction in a manner that uses the address portion of an interconnect (e.g., by becoming a master or re-sending the address for a split transaction), core 110 may use the remote copy of the region table corresponding to the initiator's core to encode the address for transmission. For example, assume that core $110_b$ receives a message from core 110a and needs to respond to this message. In this instance, core $110_b$ will access RT0 within its register file $115_b$ to encode the address for the response message.

Figure 3:
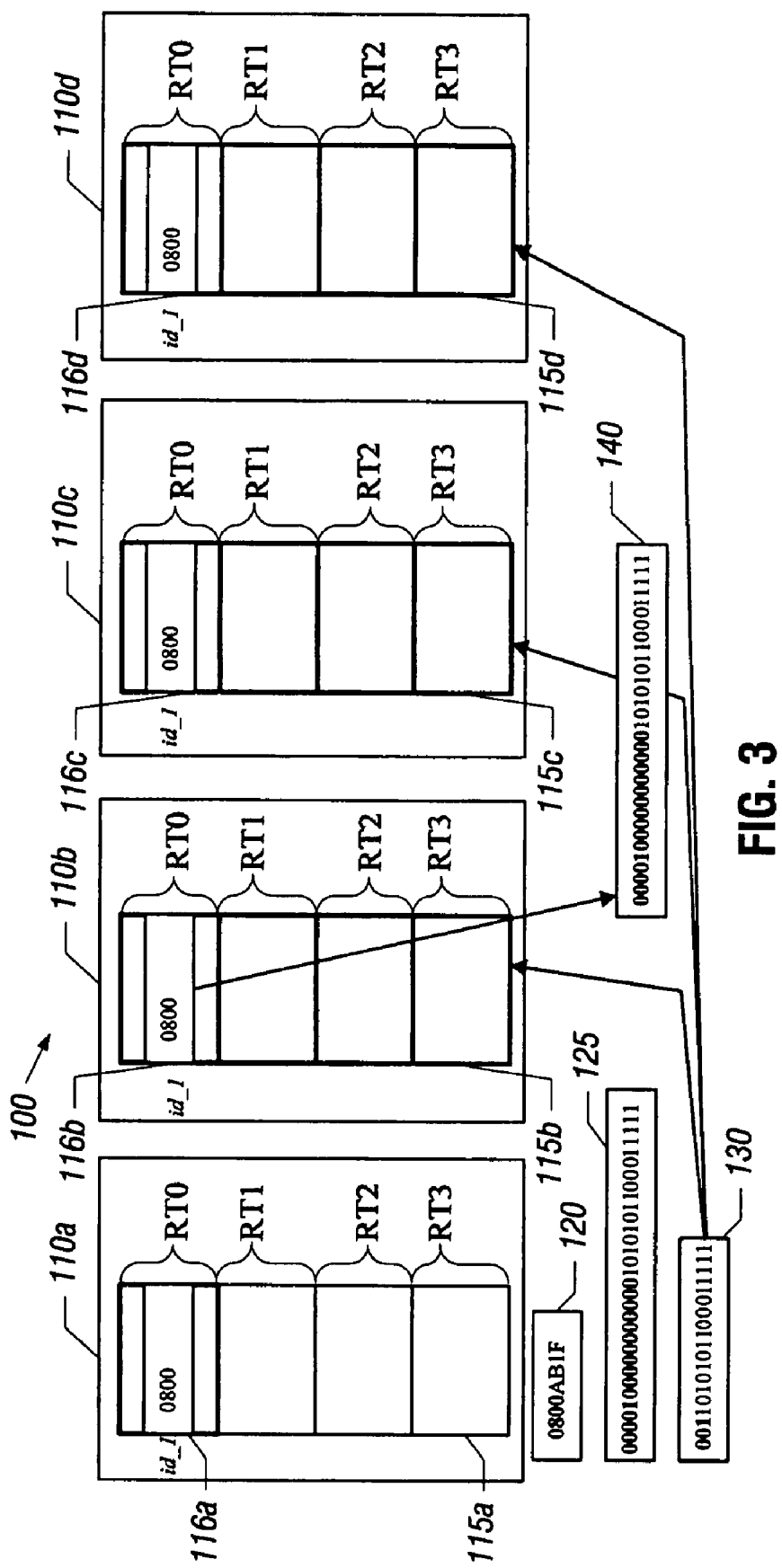
FIG. 3 is the block diagram of FIG. 2, further including generation, transmission and re-translation of a compressed memory request in accordance with an embodiment of the present invention.

Because of the locality of memory references, the vast majority of memory requests transmitted by a core may correspond to a region of memory previously and recently accessed by the core. Accordingly, the advantages of compressed transmissions of address information may be realized by the majority of requests. Referring now to FIG. 3, shown is the block diagram of processor 100 of FIG. 2, further including generation, transmission and retranslation of a compressed memory request in accordance with an embodiment of the present invention. As shown in FIG. 3, first core 110a may desire to access data at a given memory location. Specifically as shown in FIG. 3 core 110a may seek to access data at a memory address 120, i.e., corresponding to 0800AB1Fh.

Note that the 16 MSBs (in the embodiment of FIG. 3) may correspond to a region address portion of the memory address. This memory address 120 may correspond to the 32-bit memory address shown as memory address 125. As shown in FIG. 3, the region address portion (i.e., 0800h) is present in entry 116a of the local region table RT0. Because this region address portion is present in region table RT0, rather than sending the entire 32-bit address, instead core 110a may send a compressed address message 130. Specifically, compressed address message 130 may include a control indicator (i.e., a logic one value) to indicate that address message 130 is a compressed address, a 2-bit region identifier (i.e., 01b) to identify entry 116a of RT0, and a 16 bit address offset, which points to the desired memory location within the memory region. Accordingly, this compressed address message 130 may be transmitted to all other cores 110.

When compressed address message 130 is received by the various cores 110, each core may determine that the message is a compressed message by way of the control indicator. Accordingly, each core may access its corresponding remote copy of region table RT0 and use the region identifier to obtain the region address portion from the corresponding entry 116b-d. This region address portion may then be concatenated on the address offset to obtain the full 32-bit address 140, which the respective core may then use to determine whether it has the requested data. While the scope of the present invention is not limited in this regard, in some implementations a memory controller and/or cache controller may be used to perform generation of compressed addresses, transmission of the same, and re-translation into a full address at a receiving core.

Figure 4:
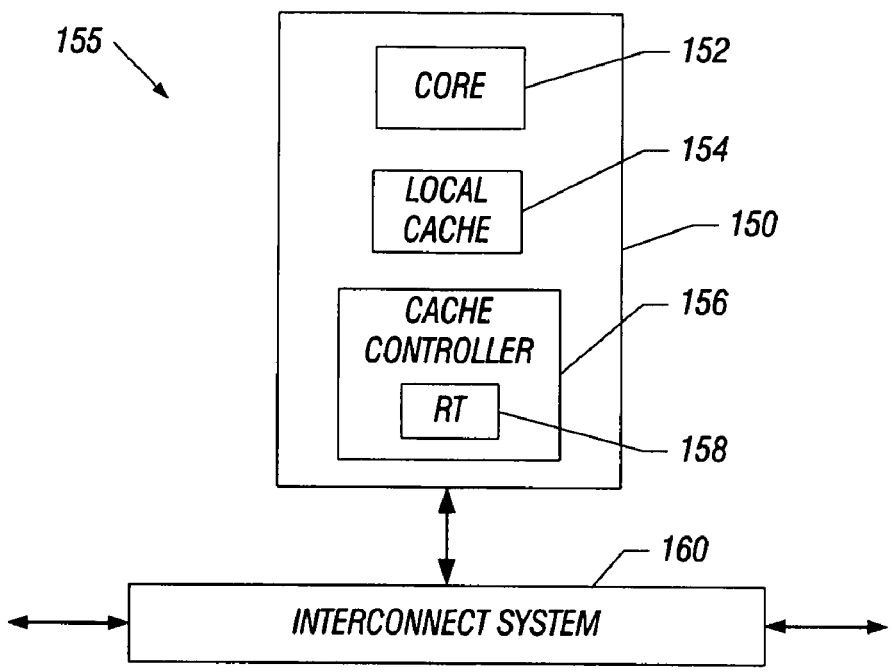
FIG. 4 is a block diagram of a portion of a system in accordance with another embodiment of the present invention.

As described above, region tables may be located at various positions with respect to their associated cores. Referring now to FIG. 4, shown is a block diagram of a portion of a system in accordance with another embodiment of the present invention. As shown in FIG. 4, system 155 may include a processor 150, which may correspond to one core module of a multi-processor chip such as a CMP. As shown in FIG. 4, processor 150 includes a core 152, which is coupled to a local cache memory 154. Local cache memory 154 may be a private cache used only by core 152. If a requested data is not present in local cache memory 154, a cache controller 156 may initiate a request for the data from another source, e.g., via an interconnect system 160 that is coupled to processor 150. As shown in the embodiment of FIG. 4, cache controller 156 may include a region table 158. Region table 158 may be the associated region table for processor 150 and may include both a local region table for local core 152, as well as a plurality of remote region tables for other cores of the CMP to which processor 150 is coupled via interconnect system 160. Of course, a region table need not be present within a cache controller and may be located, e.g., closer to an interconnect system, as the region tables may be implemented as part of an interface to an interconnect in some embodiments.

Figure 5:
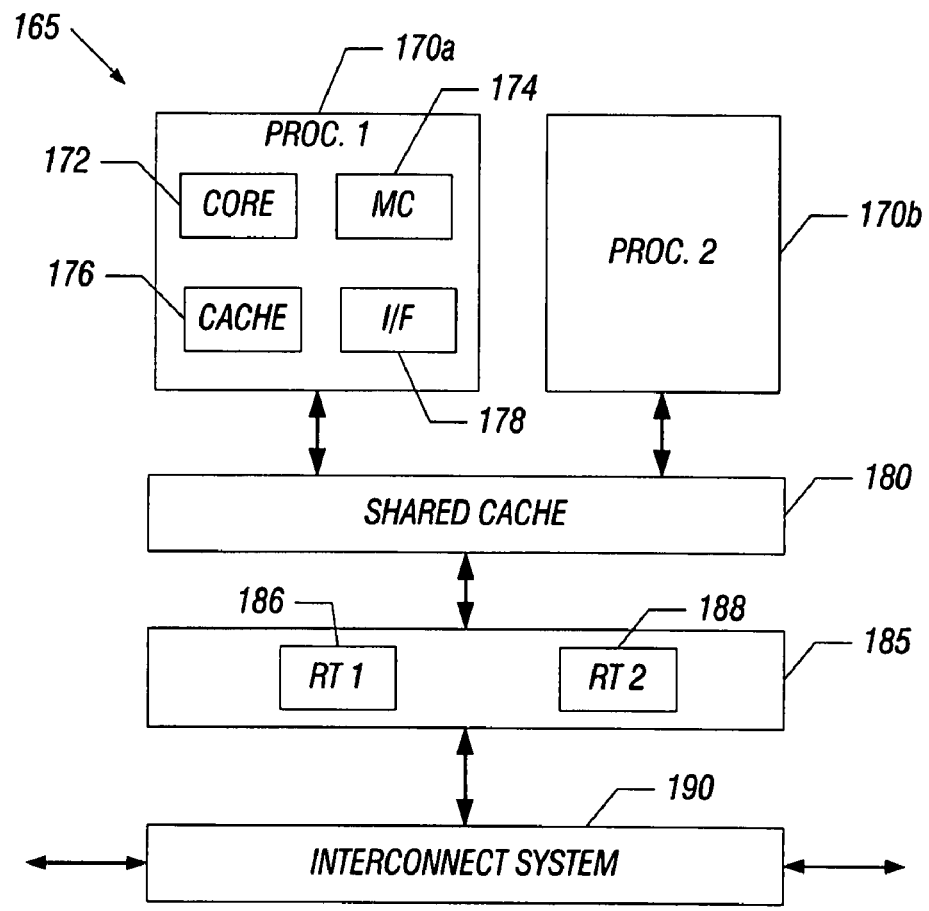
FIG. 5 is a block diagram of a portion of a system in accordance with yet another embodiment of the present invention.

Referring now to FIG. 5, shown is a block diagram of a portion of a system in accordance with yet another embodiment of the present invention. As shown in FIG. 5, a system 165 may include multiple processor modules $170_a$ and $170_b$ (generically processor module 170). As shown in FIG. 5, first processor module $170_a$ may include a core 172, a memory controller 174, a cache memory 176, and an interface 178. While shown with these particular components, additional components may be present in a given processor module and in some implementations certain functionality, such as memory controller and interface functionality may be implemented, e.g., via a cache controller of cache 176. While not shown for ease of illustration in the embodiment of FIG. 5, understand that similar components may be present within second processor module $170_b$. If requested data by core 172 is not present in local cache 176, a request may be made to a shared cache 180, which may be shared between, at least, processor modules $170_a$ and $170_b$. In some embodiments, shared cache 180 may correspond to a last level cache before data requests are sent to more remote portions of the system, e.g., via an interconnect system 190. Note that in the embodiment of FIG. 5, a storage area 185 is present that includes a first region table 186 and a second region table 188. In the embodiment of FIG. 5, first region table 186 may be associated with first processor module $170_a$, while second region table 188 may be associated with second processor module $170_b$. As with the other embodiments described herein, each of first and second region tables 186 and 188 may include a local region table for its associated core, along with remote copies of the region tables for all other cores within, e.g., a CMP of which processor modules $170_a$ and $170_b$ are a part.

Figure 6:
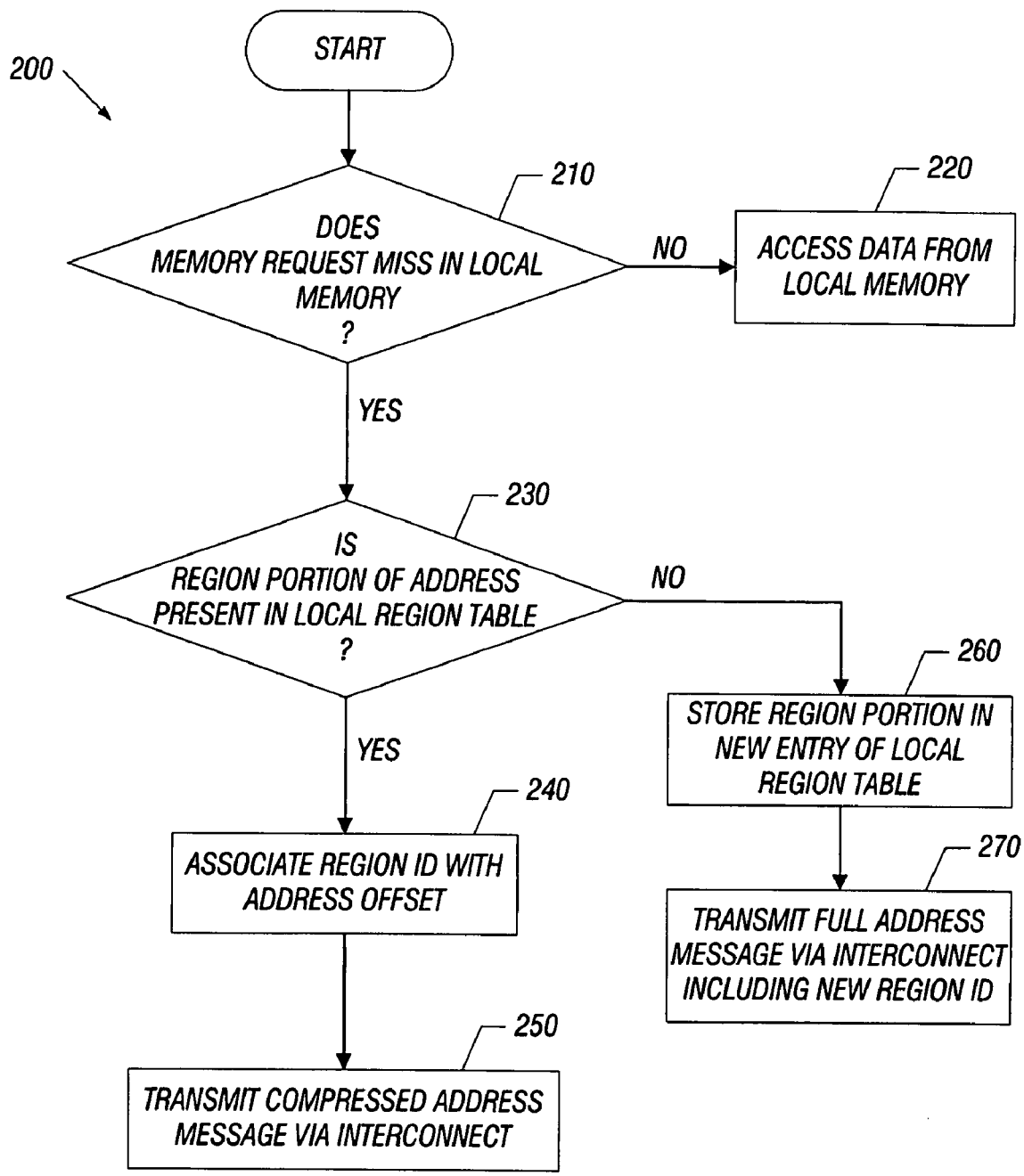
FIG. 6 is a flow diagram of a data request method in accordance with one embodiment of the present invention.

Referring now to FIG. 6, shown is a flow diagram of a data request method in accordance with one embodiment of the present invention. More specifically, method 200 may be used to request data that misses in a core. As shown in FIG. 6, method 200 may begin by determining whether a memory request misses in a local memory (diamond 210). For example, the local memory may correspond to a local cache memory. As one example, a local cache memory may be a single level private cache memory or one or more levels of a multi-level cache hierarchy. If the memory request hits in the local memory, control passes to block 220, where the data may be accessed from the local memory. Because the data is present in the local memory, the overhead associated with transmitting a memory request along an interconnect may be avoided altogether.

Referring still to FIG. 6, if instead the memory request misses in the local memory, control passes to diamond 230, where it may be determined whether a region portion of the address is present in a local region table (diamond 230). That is, using the region address portion of the requested data it may be determined whether a match is present in one of the entries of the local region table. If so, control passes to block 240 where the region identifier (i.e., the identifier of the matching entry) may be associated with the address offset (i.e., the offset to the requested memory location within the memory region). Furthermore, while not shown in the embodiment of FIG. 6 a control indicator to indicate that a compressed address message is being generated may also be included. Accordingly, this compressed address message may be transmitted via an interconnect coupled to the core (block 250). Accordingly, the data request may be sent along the interconnect in a compressed manner, potentially reducing both size of the processor (as the interconnect may have fewer wires than a width of the full memory address) and power consumption.

Referring still to FIG. 6, if instead at diamond 230 it is determined that the region address portion is not present in the local region table, control passes to block 260. At block 260, the region address portion may be stored in a new entry of the local region table. That is, because this region has been requested, given the locality of memory references it is likely that this region may again be requested in the near future. Accordingly, the region address portion may be stored in an entry of the local region table. If necessary, a pending entry may be evicted, e.g., according to an LRU algorithm. Then a full address message may be transmitted along the interconnect (block 270). Note that this full address message may take multiple transmissions to be effected, as in some implementations a smaller number of interconnects (e.g., wires) may be present than the number of bits needed to transmit the full memory address. As described above, this full address message may indicate, e.g., via a reset control indicator, that it is a full address message. Furthermore, the new region identifier may be transmitted, along with the full address. In this way, receiving cores can decode the full address message to identify the message as a full address message, obtain the new region identifier, and associate it with the new region address that is to be stored in the remote copies of the region table for the requesting core. While shown with this particular implementation in the embodiment of FIG. 6, understand that the scope of the present invention is not limited in this regard.

Figure 7:
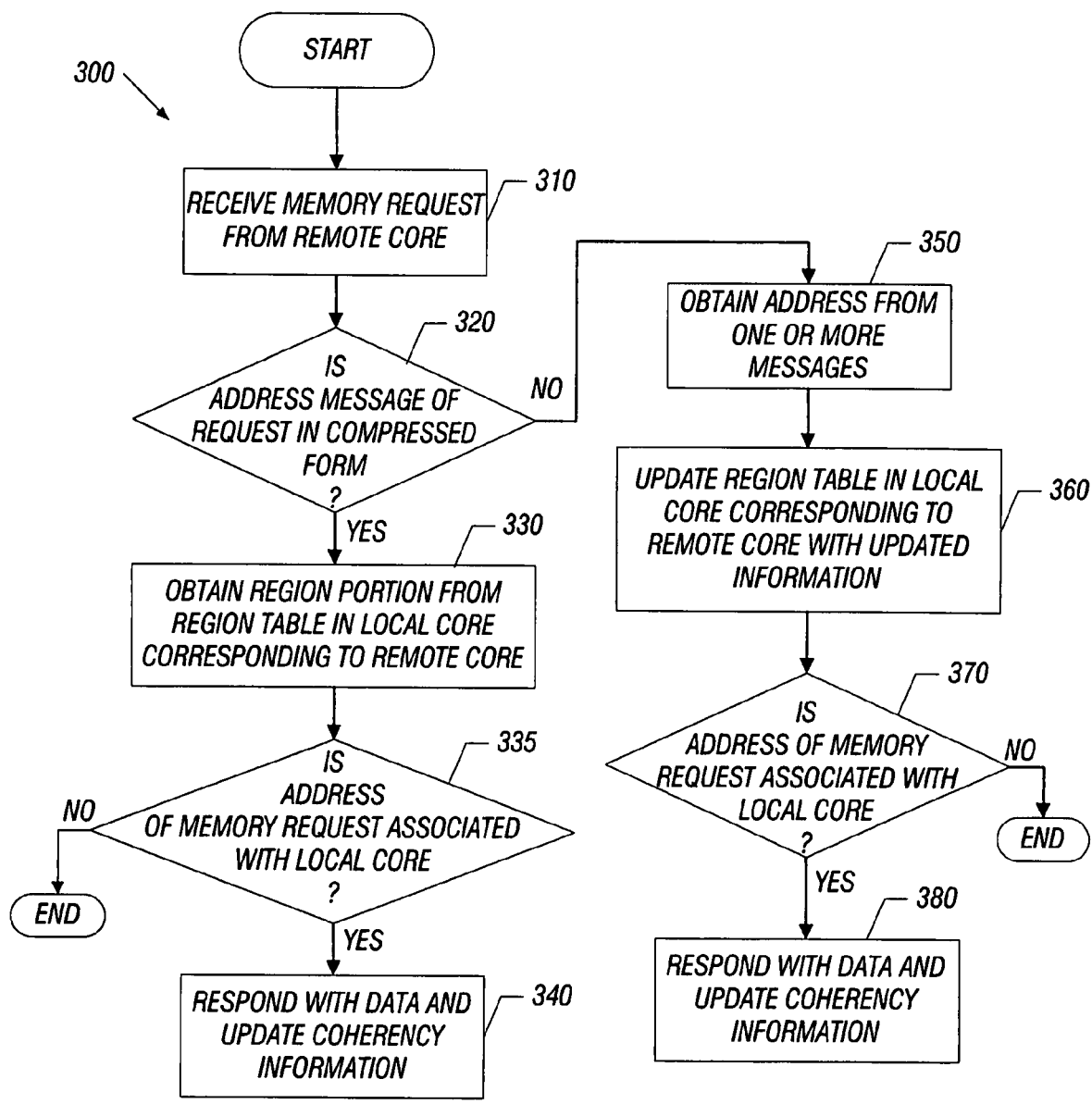
FIG. 7 is a flow diagram of a method for handling an incoming memory request in accordance with an embodiment of the present invention.

Referring now to FIG. 7, shown is a flow diagram of a method for handling an incoming memory request in accordance with an embodiment of the present invention. Generally, an incoming memory request may be analyzed to determine whether the receiving core includes the data requested or is coupled to a portion of a shared memory that includes the requested data. As shown in FIG. 7, method 300 may begin by receiving a memory request from a remote core (block 310).

First, it may be determined whether an address message of the request is in compressed form (diamond 320). While the manner of determining whether an address message is compressed may vary, in some implementations a compression indicator, e.g., the control identifier or another status bit provided with the address message may be examined to determine whether the message is compressed. For example, in one embodiment a logic low level of a MSB of the address message may indicate that the address message is a compressed message. If it is determined that the message is a compressed message, control passes to block 330. At block 330, a region portion or identifier may be obtained from the address portion and compared to corresponding entries in a remote copy of a region table for the core that transmitted the request. For example, assume that a first core transmitted the request, a receiving core may access its remote region table associated with that first core to obtain a region address portion that corresponds to the received region identifier portion. Accordingly, the region address portion of the matching entry may be accessed and concatenated onto an offset portion of the address message to thus re-translate or recover the original memory address of the data request.

Referring still to FIG. 7, based on this memory address, it may be determined whether the address is associated with the local core (diamond 335). That is, based on this memory address, the receiving core may determine whether it has the requested data or is associated with, e.g., a shared memory that has the data. If so, the receiving core may respond with the data. Furthermore, in some implementations coherency information, e.g., associated with a given coherency protocol may also be updated (block 340). Note that a response message may also be sent via a compressed address. Furthermore, in some embodiments a response may be broadcast to all nodes of a CMP, e.g., so that coherency information may be updated. If instead the data is not present, no further action may be taken.

Referring still to FIG. 7, if instead it is determined at diamond 320 that the address message is not in compressed form, control passes to block 350. At block 350, the receiving core may obtain the address from one or more incoming address messages. That is, because the number of wires of an interconnect may be less than the number of corresponding bits of a full address, it may take several address messages to obtain the full address message. Furthermore, the region table in the local (i.e., receiving) core corresponding to the requesting core may be updated with the new region address of the full address message (block 360). That is, the full address message may include a region identifier, which may be used by the receiving core to identify an entry in the remote region table that is to be updated with the region address of the full address message. Accordingly, this remote copy of the requesting core's local region table may be updated to match that of the requesting core. Accordingly, when future compressed messages for a memory location in this region of memory are received, the receiving core may properly obtain the correct full address from the compressed address message using the region address present in the remote copy of the requesting core's region table.

Still referring to FIG. 7, it may then be determined whether the decoded address of the memory request is associated with the local core (diamond 370). If not, method 300 may conclude. If instead the address is associated with the local core, the receiving core may respond with the requested data and update coherency information (block 380), as described above.

Figure 8:
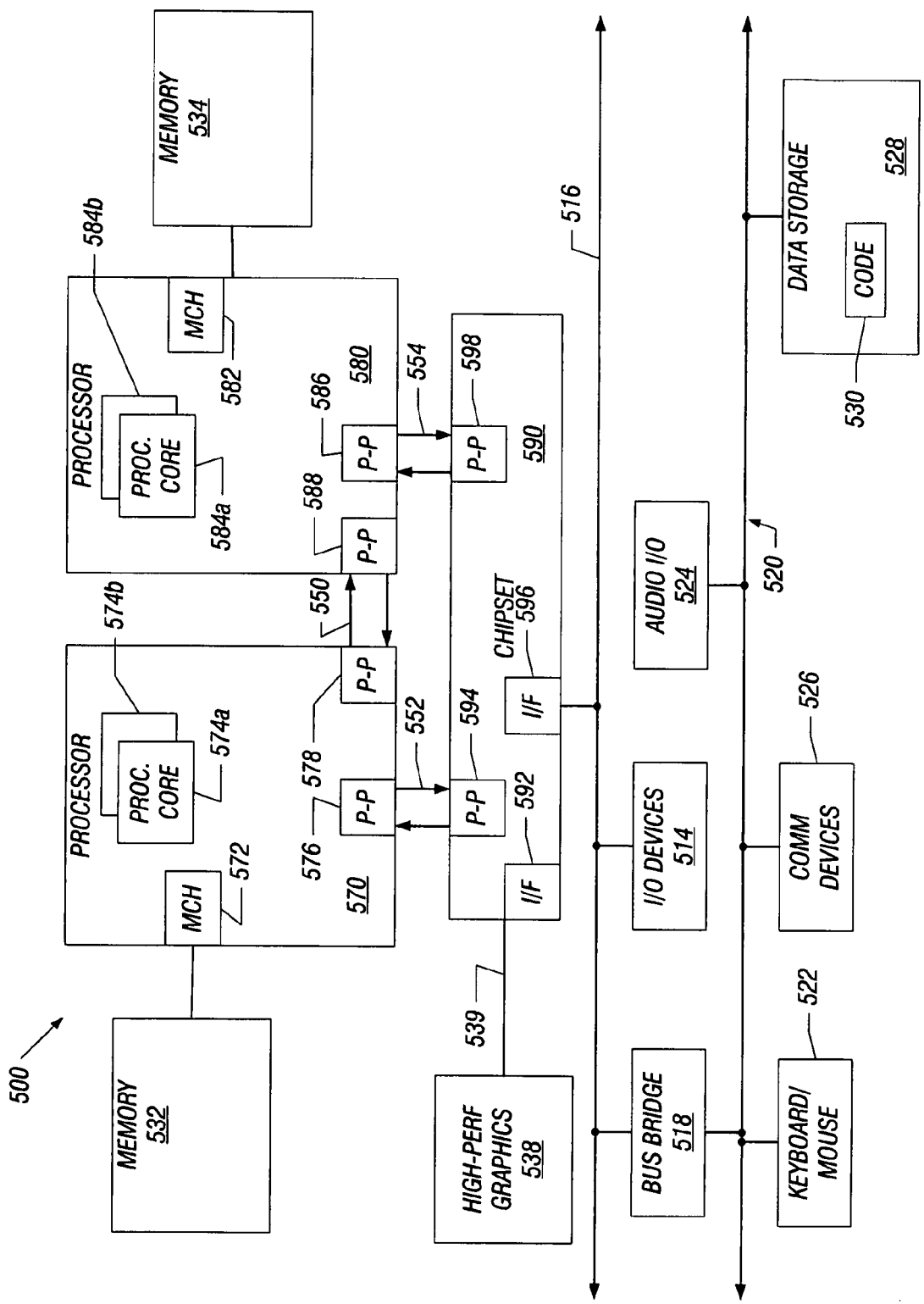
FIG. 8 is a block diagram of a multiprocessor system in accordance with an embodiment of the present invention.

Embodiments may be implemented in many different system types. Referring now to FIG. 8, shown is a block diagram of a multiprocessor system in accordance with an embodiment of the present invention. As shown in FIG. 8, the multiprocessor system is a point-to-point interconnect system, and includes a first processor 570 and a second processor 580 coupled via a point-to-point interconnect 550. However, in other embodiments the multiprocessor system may be of another interconnect architecture, such as a multi-drop bus or another such implementation. As shown in FIG. 8, each of processors 570 and 580 may be many-core processors including first and second processor cores (i.e., processor cores 574*a* and 574*b* and processor cores 584*a* and 584*b*) although other cores and potentially many more other cores may be present in particular embodiments. Each of cores 574*a*, 574*b* and 584*a*, 584*b* may further include a region table to store associations to memory regions. Accordingly, address interconnects both internal to processors 570 and 580, and external interconnects therebetween (e.g., interconnect 550) may have a reduced number of wires.

Still referring to FIG. 8, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 8, MCH's 572 and 582 couple the processors to respective memories, namely a memory 532 and a memory 534, which may be portions of main memory locally attached to the respective processors. In some implementations, at least some amount of global memory may be implemented within processors 570 and 580.

First processor 570 and second processor 580 may be coupled to a chipset 590 via P-P interconnects 552 and 554, respectively. As shown in FIG. 8, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 8, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Figure 9:
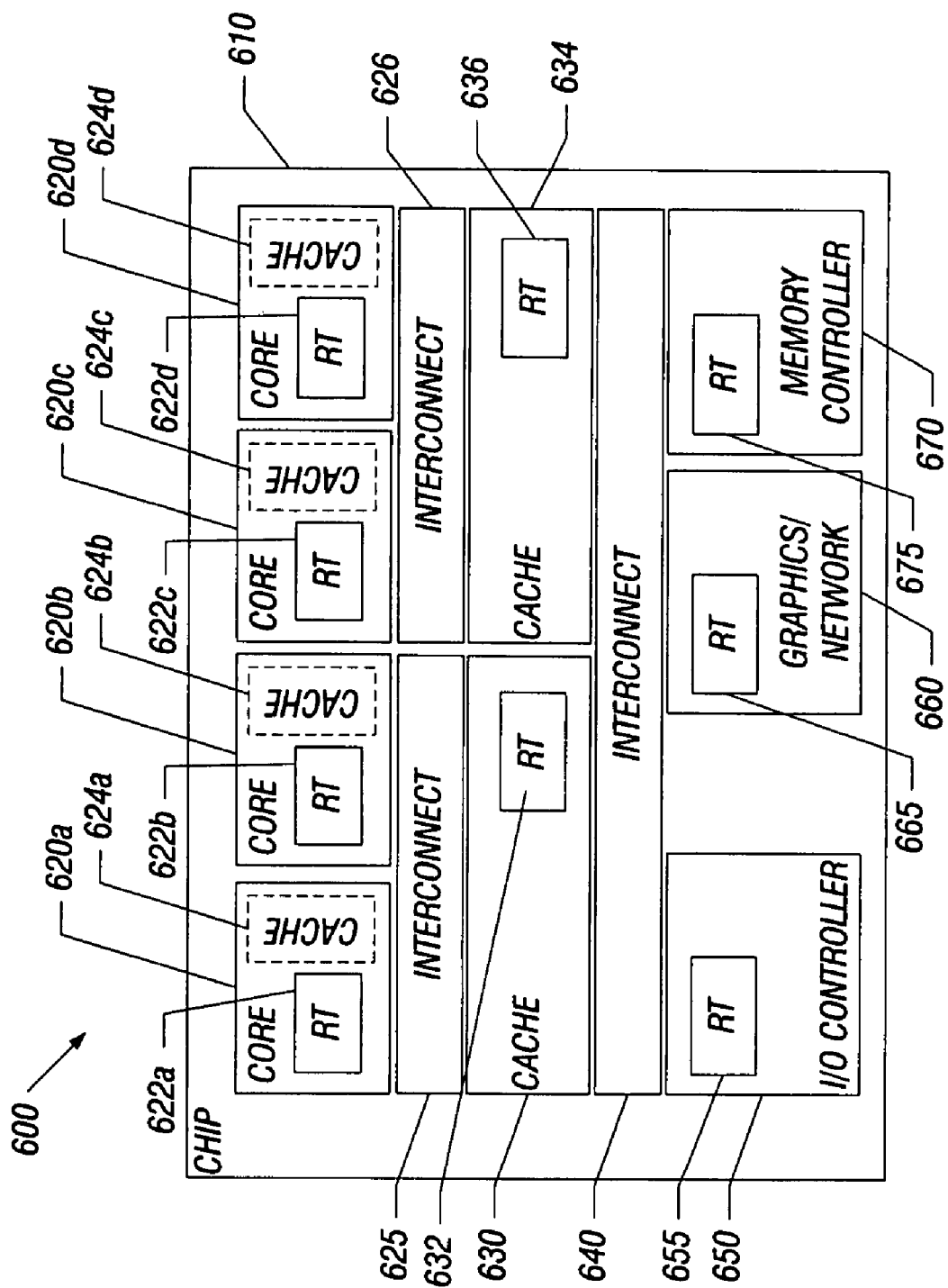
FIG. 9 is a block diagram of another system in accordance with an embodiment of the present invention.

Referring now to FIG. 9, shown is a block diagram of another system in accordance with one embodiment of the present invention. As shown in FIG. 9, system 600 may be a system on a chip (SOC), chip multiprocessor (CMP) or other such system including a chip 610. In the embodiment of FIG. 9, in addition to providing region tables in the various cores of chip 610, region tables may also be provided in other agents (e.g., various memories and other components such as controllers, network devices and the like). Thus as shown in FIG. 9, chip 610 includes a plurality of cores 620a-620d (generically core 620). Each core 620 may include a corresponding region table 622a-622d (generically region table 622), and a local cache memory 624a-624d (generically cache 624), which may be a private cache.

As shown in the embodiment of FIG. 9, cores 620 may be coupled via interconnects 625 and 626 to shared caches 630 and 634, each including a region table, respectively region tables 632 and 636. In turn, caches 630 and 634 may be coupled via an interconnect 640 to various peripheral components including in the embodiment of FIG. 9 an input/output controller 650 having a region table 655, a graphics/network controller 660 having a region table 665, and a memory controller 670 having a region table 675. Note that in the embodiment of FIG. 9, each of these region tables for each of the components within core 610 may include a local region table for the corresponding agent (i.e., core, cache, controller and so forth), as well as remote region tables for each of the other components within chip 610. While described with this particular implementation in the embodiment of FIG. 9, of course other implementations are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining if data of a memory request by a first agent is in a memory region represented by a region indicator of a region table of the first agent; and
    transmitting a compressed address for the memory request to a plurality of agents if the memory region is represented by the region indicator, otherwise transmitting a full address.

2. The method of claim 1, further comprising generating the compressed address having a compression indicator, the region indicator, and an offset address portion.

3. The method of claim 1, further comprising searching the region table of the first agent for an entry including a memory region address portion corresponding to the memory region.

4. The method of claim 3, further comprising creating an entry in the region table of the first agent including the memory region address portion corresponding to the memory region if the searching results in a miss.

5. The method of claim 1, wherein transmitting the full address comprises transmitting a plurality of address messages each including a non-compression indicator and at least a portion of a memory address for the memory request.

6. The method of claim 5, further comprising transmitting the full address via an interconnect having a plurality of conductors less than the number of bits of a full memory address, the interconnect coupled to the plurality of agents, wherein the plurality of agents comprises at least one core of a chip multiprocessor (CMP) and at least one storage.

7. The method of claim 1, further comprising receiving the compressed address in a second agent coupled to the first agent via an interconnect, and generating a full memory address in the second agent, wherein the first and second agents comprise cores of a chip multiprocessor (CMP).

8. The method of claim 7, further comprising obtaining a memory region address portion present in a remote region table of the second agent corresponding to the first agent accessed via a region indicator of the compressed address to concatenate the memory region address portion with an address offset of the compressed address to generate the full memory address.

9. An apparatus comprising:
    a local region table to store a plurality of region addresses each corresponding to a region of memory in which data previously requested by a local agent is located, wherein each region address is associated with a region indicator of the local region table; and
    a remote region table to store a plurality of remote region addresses each corresponding to a region of memory in which data previously requested by a remote agent is located, wherein each remote region address is associated with a remote region indicator of the remote region table.

10. The apparatus of claim 9, wherein the local agent further comprises a controller to generate a memory request including a compressed address portion having a compression indicator and a region indicator associated with the region address of the local region table in which data of the memory request is located.

11. The apparatus of claim 10, wherein the controller is to generate a full address portion if the memory request is for a memory region not having a region address in the local region table, and wherein the controller is to insert the missing region address in the local region table and transmit a region indicator for the inserted region address with the full address portion.

12. The apparatus of claim 10, further comprising an interconnect coupled to the local agent and a plurality of remote agents to communicate the memory request, wherein the interconnect includes a plurality of conductors less than a number of bits of an address for the memory.

13. The apparatus of claim 9, wherein the apparatus comprises a chip multiprocessor (CMP) including the local agent, the local agent having a storage including the local region table and a plurality of remote region tables, each associated with a different remote agent.

14. The apparatus of claim 13, wherein the local core is to update one of the plurality of remote region tables based on a data request message received from the corresponding remote agent.

15. The apparatus of claim 13, further comprising a local cache memory coupled between the local core and the storage.

16. The apparatus of claim 9, wherein the apparatus comprises a chip multiprocessor (CMP) having:
a local cache memory coupled to the local agent;
a shared cache memory coupled to the local cache memory;
a storage coupled to the shared cache memory to store the local region table and the remote region table; and
an interconnect coupled to the storage, wherein the interconnect is coupled to a plurality of remote storages each associated with at least one remote agent, each of the plurality of remote storages including a copy of the local region table.

17. The apparatus of claim 9, further comprising:
a first cache memory coupled to the local agent via a first interconnect, the first cache memory including a region portion to store a first plurality of region tables; and
a controller coupled to the first cache memory via a second interconnect, the controller to store a second plurality of region tables.

18. A system comprising:
a plurality of cores;
a plurality of storage areas each associated with one of the plurality of cores, wherein each storage area includes a local table for the associated core and a plurality of remote tables for the other cores, wherein the associated core is to write and evict entries of the local table and is to read and update entries of the plurality of remote tables responsive to messages received from the corresponding other cores; and
a dynamic random access memory (DRAM) coupled to the plurality of storage areas.

19. The system of claim 18, further comprising an interconnect coupled between the DRAM and the plurality of storage areas, wherein the interconnect includes a number of wires less than a number of address bits to access the DRAM.

20. The system of claim 19, wherein the interconnect comprises a coherent interconnect.

21. The system of claim 19, further comprising a chip multiprocessor (CMP) including the plurality of cores, the plurality of storage areas and the interconnect.

22. The system of claim 18, wherein the local table is to store region addresses for regions of the DRAM from which the associated core has requested data.

23. The system of claim 18, further comprising a plurality of local cache memories each coupled between one of the plurality of cores and the associated storage area.

24. The system of claim 18, wherein an associated core is to send a compressed address message for a data request if a region address for the data request is present in the local table, otherwise the associated core is to send a full address message for the data request and store the missing region address in the local table.

25. An article comprising a machine-readable medium including instructions that if executed by a machine cause the machine to perform a method comprising:
determining if a data request received by a first core from a second core of multi-core system includes a compressed address; and
accessing a remote copy of a region table associated with the first core to obtain a region address portion of the data request if the compressed address is included, otherwise updating the remote copy of the region table with a region address portion included with the data request.

26. The article of claim 25, wherein the method further comprises generating a full address for the data request in the first core by concatenating the region address portion onto an offset portion of the compressed address.

27. The article of claim 25, wherein the method further comprises generating a response message in the first core using an identifier of an entry in the remote copy of the region table including the region address portion, wherein the response message includes a compressed address.

28. The article of claim 27, wherein the method further comprises broadcasting the response message to update coherency information in the multi-core system.

* * * * *